United States Patent [19]
Berkes

[11] 4,029,324
[45] June 14, 1977

[54] SEAL ASSEMBLY FOR CONTROL LEVER

[75] Inventor: Benjamin L. Berkes, Sagamore Hills, Ohio

[73] Assignee: General Motors Corporation, Detroit, Mich.

[22] Filed: June 4, 1976

[21] Appl. No.: 692,660

[52] U.S. Cl. .................................. 277/30; 74/566; 277/100

[51] Int. Cl.² ........................................ F16J 15/16

[58] Field of Search ............ 277/30, 100, 173, 174, 277/175; 74/566; 308/139, 157, 158, 159

[56] References Cited

UNITED STATES PATENTS

| 1,063,389 | 6/1913 | Robbins | 277/100 |
| 2,174,504 | 9/1939 | Cole | 277/30 |
| 2,860,895 | 11/1958 | Mosbacher | 277/30 |
| 2,957,713 | 10/1960 | Herbenar | 277/100 |
| 3,748,923 | 7/1973 | Babbitt et al. | 277/100 |
| 3,971,564 | 7/1976 | Bowen et al. | 277/30 |

*Primary Examiner*—Harry N. Haroian
*Assistant Examiner*—L. Footland
*Attorney, Agent, or Firm*—Edward J. Biskup

[57] ABSTRACT

A sealing assembly for a control lever that extends through an opening. The sealing assembly includes a plurality of stacked seal members that have mating surfaces which allow movement of the control lever about a pair of mutually perpendicular nonintersecting axes.

3 Claims, 3 Drawing Figures

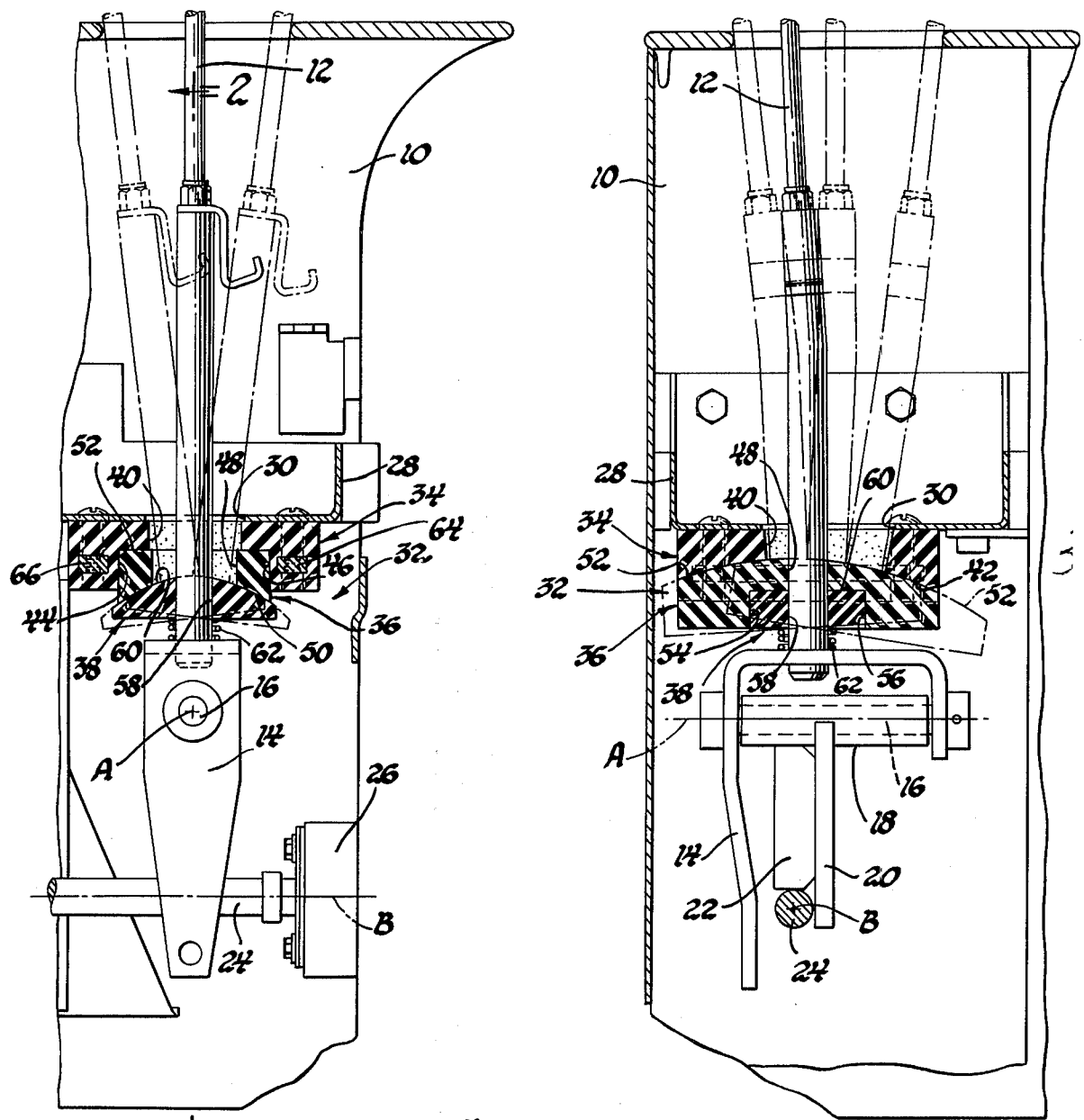
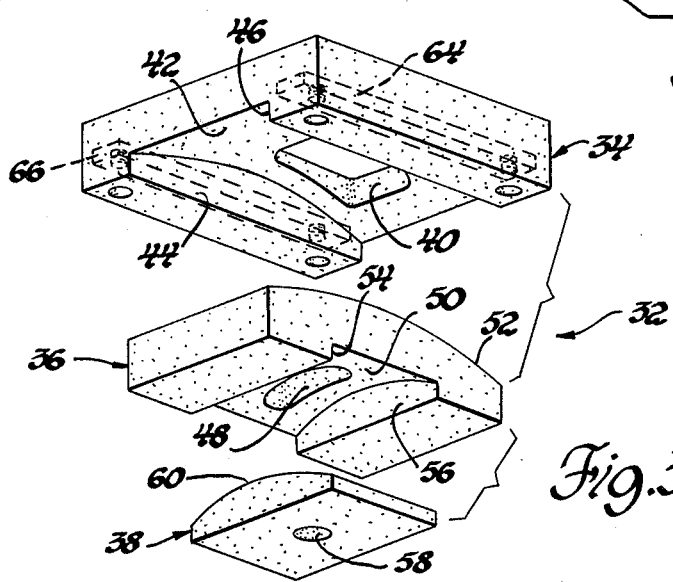

SEAL ASSEMBLY FOR CONTROL LEVER

This invention concerns seals in general and more particularly is directed to a sealing assembly for a control lever that extends through an opening in the wall of an earthmoving vehicle operator's cab structure.

More specifically, the seal assembly according to the invention includes a stationary base member and a pair of seal members the latter of which are carried by the control lever and adapted to move relative to the base member during movement of the control lever. The seal assembly serves to seal an enlarged opening in a wall through which the control lever extends so as to prevent dust and other foreign material from entering the inside of an operator's cab. In the preferred form, the base member and the two seal members are arranged sequentially one above the other so as to provide an intermediate seal member adjacent to the base member and a lower seal member below the intermediate seal member. Both the base member and intermediate seal member are formed with grooves for accommodating the adjacent seal member with the grooves extending in directions which permit movement of the lever about a pair of mutually perpendicular axes. The arrangement is such that when the control lever is pivoted about one of the axes, the intermediate and lower seal members move relative to the base member and when the control lever is pivoted about the other axis, the lower seal member moves relative to the intermediate seal member and the base member.

The objects of the present invention are to provide a new and improved sealing arrangement for a control lever that is located in an enlarged opening and which allows the control lever to pivot about a pair of mutually perpendicular axes; to provide a new and improved sealing arrangement for a control lever that extends through an opening in a console and includes three stacked plastic members that have mating surfaces which limit movement of the control lever to paths lying in mutually perpendicular planes; and to provide a new and improved seal for a control lever that utilizes relatively slidable members that are biased into sealing engagement with each other and have curved mating surfaces located on sectors of a pair of circles with each circles having a different radius.

Other objects and advantages of the present invention will be more apparent from the following detailed description when taken with the drawings in which:

FIG. 1 is a side elevational view showing a sealing arrangement made according to the present invention;

FIG. 2 is a view taken on line 2—2 of FIG. 1; and

FIG. 3 is an exploded view showing in detail the various parts of the seal assembly.

Referring to the drawings and more particularly FIGS. 1 and 2 thereof, a partial view is shown of a console of the type that is normally installed in the operator's cab of an off-highway earthmoving vehicle. The console has a housing 10 which, in this case, includes a control lever 12 the lower end of which is rigidly connected to an inverted J-shaped bracket 14. The bracket 14 is pivotally supported by a transversely extending pin 16 for movement about a horizontal axis A extending longitudinally through the center of the pin 16. It will be noted that the pin 16 is located within a sleeve 18 that is fixed by vertical plates 20 and 22 with a cylindrical member 24 one end of which extends into a housing 26. The cylindrical member 24 allows the control lever 12 to pivot about the longitudinal center axis thereof. The latter axis, identified by the letter B extends horizontally and is located below the horizontal axis A and also lies in a vertical plane that is perpendicular to a vertical plane passing through the horizontal axis A.

The lower end of the bracket 14 is intended to be connected to suitable linkage (not shown) for operating a control member for the drive system or hydraulic system of the earthmoving vehicle. Similarly, the cylindrical member 24 when rotated by the control lever 12 about its longitudinal center axis is intended to provide actuation of some part of the operating system on the vehicle. Thus, by moving the control lever 12 to the phantom line positions shown in FIG. 1, the lower end of the bracket 14 pivots about the horizontal axis A and causes the desired movement of the connecting linkage. Also, movement of the control lever 12 to the phantom line positions shown in FIG. 2 results in rotation of the cylindrical member about the axis B passing through the center thereof with resulting actuation of the control system which is intended to respond to this movement of the control lever.

The housing 10 includes a cup-shaped wall 28 which has an enlarged opening 30 formed therein through which the control lever 12 extends. In order to seal this opening so as to prevent dust and other foreign material from entering the inside of the operator's cab, a seal assembly 32, according to the invention, is provided. This seal assembly 32 comprises a rectangularly shaped base member 34, an intermediate seal member 36, and a lower seal member 38. The top portion of the base member 34 is secured to the lower surface of the wall 28 and has an opening 40 centrally formed therein of a size that allows movement of the control lever 12 along the aforementioned mutually perpendicular planes as the control lever 12 is moved between the phantom line positions shown in FIGS. 1 and 2. The bottom portion of the base member 34 is formed with a groove that is defined by a curved surface 42 and a pair of parallel side walls 44 and 46. The surface 42 lies on the sector of a circle having its center coaxial with the center point of the cylindrical member 24 as seen in FIG. 2.

The groove in the base member 34 serves to accommodate the intermediate seal member 36 which is formed with an oblong slot 48 through which the control lever 12 extends. The major axis of the slot 48 is positioned in a vertical plane perpendicular to the longitudinal axis of the groove formed in the base member 34. The distance between the side walls of the slot 48 is equal to the diameter of the shank portion of the control lever 12 that is located in the slot 48. As in the case with the base member 34, the intermediate seal member 36 has a groove formed in the bottom portion thereof that has a curved surface 50. The curved surfaces 50 lies on the sector of a circle having its center coaxial with the horizontal center axial A as seen in FIG. 1. The upper surface 52 of the intermediate seal member 36 is complementary to the curved surface 42 of the base member 34 and is adapted to mate therewith. In addition, the groove formed in the intermediate seal member 36 is bounded by a pair of parallel side walls 54 and 56 and serves to accommodate the lower seal member 38 which has a circular opening 58 formed therein through which the shank of control lever 12 extends. The opening 58 is of a size equal to the diameter of the shank.

The upper surface 60 of the lower seal member 38 is complementary to and mates with the curved surface 50 of the intermediate seal member 36 and is movable therealong when the control lever is pivoted about the horizontal axis A as seen in FIG. 1. Located between the lower seal member 38 and the bracket 14 is a coil spring 62 which serves to bias the base member 34 and seal members 36 and 38 into an operative position. All three of the parts of the seal assembly are made of a plastic material such as urethane and, as seen in FIG. 3, the side portions of the base member 34 adjacent the side walls 44 and 46 have embedded therein metal reinforcing members 64 and 66 which are tapped and serve to accommodate fasteners used for mounting the top portion of the base member 34 to the wall 28.

From the above description, it should be apparent that when the control lever 12 is moved between the positions shown in FIG. 1, the lower seal member 38 will slide relative to the intermediate seal member 36 and the base member 34 to the positions shown in the phantom lines while maintaining sealing engagement with the curved surface 50. Also when the control lever 12 is moved between the phantom line positions shown in FIG. 2, both the intermediate seal member 36 and the lower seal member 38 will move relative to the base member 34 while maintaining sealing engagement with the curved surface 42. Therefore, the seal assembly 32 provides an effective sealing arrangement while allowing the control lever 12 to pivot about a pair of mutually perpendicular nonintersecting axes.

Various changes and modifications can be made in this construction without departing from the spirit of the invention. Such changes and modifications are contemplated by the inventor and he does not wish to be limited except by the scope of the appended claims.

I claim:

1. In combination, a wall having an enlarged opening therein, a seal assembly for sealing said enlarged opening in said wall, a control lever extending through the enlarged opening and being supported for pivotal movement about first and second mutually perpendicular non-intersecting axes with the first axis being located further from said wall than the second axis, said seal assembly comprising a stationary base member and first and second seal members adapted to be carried by the control lever and to move relative to the base member during movement of the control lever, said base member having an opening to allow movement of said control lever about said first and second axes, a first groove formed in said base member and having a first curved surface located on a sector of a circle generated by a point on said control lever as the latter is pivoted about said first axis, the first seal member being located in said first groove and having a complementary curved surface sealingly engaging said first curved surface of said first groove, a second groove formed in said first seal member and having a second curved surface located on a sector of a circle generated by a point located on the control lever as the latter is pivoted about the said second axis, said second seal member located in the second groove and having a complementary curved surface sealingly engaging said second curved surface of said second groove, the arrangement being such that when the control lever is pivoted about the first axis the first and second seal members move relative to the base member and when the control lever is pivoted about the second axis the second seal member moves relative to the first seal member and the base member.

2. In combination, a wall having an enlarged opening therein, a seal assembly for sealing said enlarged opening in said wall, a control lever extending through the enlarged opening and being supported for pivotal movement about first and second mutually perpendicular non-intersecting axes with the first axis being located further from said wall than the second axis, said seal assembly comprising a stationary base member and first and second seal members adapted to be carried by the control lever and to move relative to the base member during movement of the control lever, said base member having an opening to allow movement of said control lever about said first and second axes and being attached to said wall so that the latter mentioned opening registers with said enlarged opening in the wall, a first groove formed in said base member and being defined by a pair of side walls and a first curved surface located on a sector of a circle generated by a point on said control lever as the latter is pivoted about said first axis, the first seal member being located in said first groove and having a complementary curved surface sealingly engaging said first curved surface of said first groove, a second groove formed in said first seal member and being defined by a pair of side walls and a second curved surface located on a sector of a circle generated by a point located on the control lever as the latter is pivoted about the said second axis, said second seal member located in the second groove and having a complementary curved surface sealingly engaging said second curved surface of said second groove, the arrangement being such that when the control lever is pivoted about the first axis the first and second seal members move relative to the base member and when the control lever is pivoted about the second axis the second seal member moves relative to the first seal member and the base member.

3. In combination, a wall having an enlarged opening therein, a seal assembly for sealing said enlarged opening in said wall, a control lever extending through the enlarged opening and being supported for pivotal movement about first and second mutually perpendicular non-intersecting axes with the first axis being located further from said wall than the second axis, said seal assembly comprising a base member and first and second seal members adapted to be carried by the control lever and to move relative to the base member during movement of the control lever, said base member having an opening to allow movement of said control lever about said first and second axes, means for attaching said base member to said wall so that the opening in the base member registers with said enlarged opening in the wall, a first groove formed in said base member and having a first curved surface located on a sector of a circle generated by a point on said control lever as the latter is pivoted about said first axis, the first seal member being located in said first groove and having a complementary curved surface sealingly engaging said first curved surface of said first groove, said first seal member having an oblong slot formed therein for accommodating said control lever, a second groove formed in said first seal member and having a second curved surface located on a sector of a circle generated by a point located on the control lever as the latter is pivoted about the said second axis, said second seal member located in the second groove and having a complementary curved surface sealingly engaging said second curved surface of said second groove, the arrangement being such that when the control lever is pivoted about the first axis the first and second seal members move relative to the base member and when the control lever is pivoted about the second axis the second seal member moves relative to the first seal member and the base member.

* * * * *